United States Patent

English

[15] 3,649,079
[45] Mar. 14, 1972

[54] AUTOMOTIVE WHEEL STRUCTURE
[72] Inventor: Frank F. English, Walnut Creek, Calif.
[73] Assignee: International Mfg. Co., Inc., Benicia, Calif.
[22] Filed: Feb. 19, 1971
[21] Appl. No.: 116,817

Related U.S. Application Data

[63] Continuation-in-part of Ser. No. 783,046, Dec. 11, 1968, abandoned.

[52] U.S. Cl............................................301/9 DN, 301/65
[51] Int. Cl..........................................................B60b 3/16
[58] Field of Search......................301/9 DN, 65, 9 AN, 9 SD

[56] References Cited

UNITED STATES PATENTS

| 1,856,866 | 5/1932 | Feigelson | 301/9 SB |
| 3,207,557 | 9/1965 | Hunter | 301/9 DN X |
| 3,329,468 | 7/1967 | Beith | 301/9 DN |
| 3,459,455 | 8/1969 | Meunch | 301/9 DN |
| 3,428,365 | 2/1969 | French | 301/9 DN |

*Primary Examiner*—Richard J. Johnson
*Attorney*—Harris Zimmerman

[57] ABSTRACT

A wheel structure adapted to be mounted upon the drum and axle assembly of an automobile or the like and having a generally universal mounting arrangement so as to accommodate a variety of drum and axle assemblies having lug bolts thereabout describing circles of different diameter. The wheel structure includes a locator plate provided with alignment means adapted to establish a predetermined axially centered orientation between it and such drum and axle assembly upon which it is mounted, and the wheel structure further includes a wheel that defines with the locator plate centering structure by means of which the wheel has enforced thereon a condition of coaxiality with the axis of rotation defined by such drum and axle assembly prior to the installation of the lug nuts on the lug bolts.

11 Claims, 6 Drawing Figures

Patented March 14, 1972
3,649,079
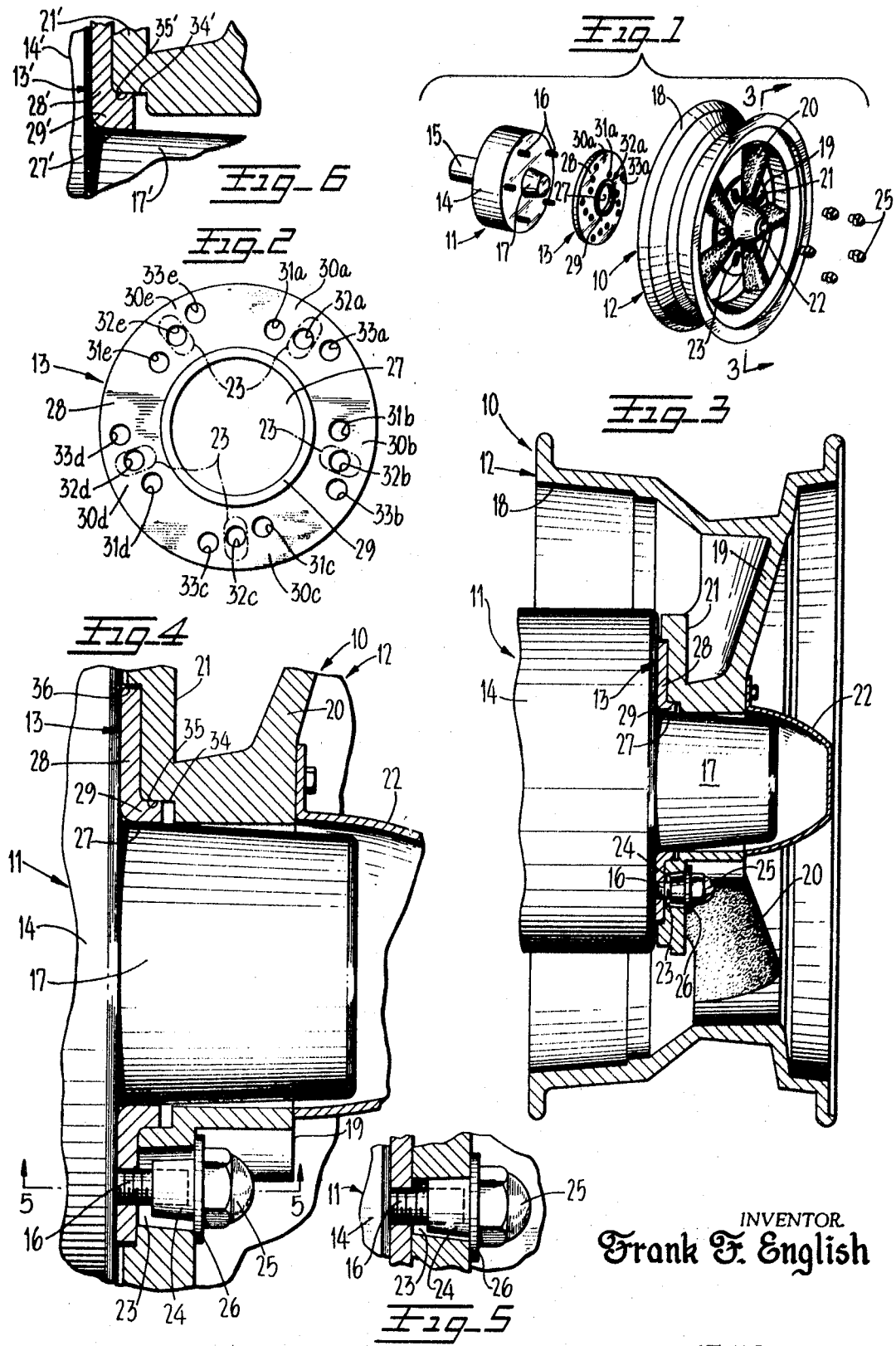
INVENTOR.
Frank F. English
ATTORNEYS

AUTOMOTIVE WHEEL STRUCTURE

This application is a continuation-in-part of my application Ser. No. 783,046, filed Dec. 11, 1968, and now abandoned.

This invention relates to a wheel structure for an automotive vehicle or the like and, more particularly, to a wheel structure adapted to be mounted upon the drum and axle assembly of a variety of vehicles in which the lug bolts thereof describe circles of different diameter. The invention is particularly suited for use with custom-made cast wheels such as those formed of relatively lightweight materials including aluminum, magnesium, and alloys thereof.

Automotive enthusiasts and especially those interested in racing often purchase custom-made wheels to replace the original equipment on their automobiles either to enhance the esthetic appearance thereof or to reduce overall weight. In the latter instance, the wheels are often cast (at least partially) from relatively lightweight materials such as aluminum, magnesium or alloys thereof, and often the wheels have large open areas in their center webs to reduce the weight thereof. One problem with custom automobile wheels, especially cast wheels having spaced apart spokes forming the center web thereof, is that the drum and axle assemblies of different automobiles do not necessarily have lug bolts spaced apart about circles all of which have the same diameter. Instead, a number of circles are defined by the lug bolts of different automobiles, and such circles ordinarily have diameters of 4½, 4¾, or 5 inches (there are certain other common diameters, principally 5½ inches, but they are not economically important); and, therefore, suppliers of custom wheels for the most part have had to maintain large inventories in order to provide custom wheels to fit any of the variety of automobiles for which they may be required.

In order to alleviate this problem, efforts have been made heretofore to provide custom wheels with universal mountings so that a single wheel structure can be mounted upon the drum and axle assembly of a variety of different automobiles. Such prior efforts have taken a number of forms such as use of a plurality of inserts respectively associated with large lug bolt openings in the center webs of the wheels to closely fit such openings to the shanks of the lug nuts passed therethrough, or use of a plurality of holes in the center webs of the wheels to make a single wheel selectively mountable upon a variety of drum and axle assemblies. Such prior efforts have not been completely satisfactory, and an object, among others, of the present invention, is to provide an improved wheel structure having substantially universal mounting means enabling it to accommodate a variety of different automobiles and which, at the same time, by means of a separate locating device, enforces on the wheel a condition of coaxiality with the axis of rotation defined by the drum and axle assembly upon which the wheel is mounted, prior to and independent of the installation of the lug nuts on the lug bolts.

Another object is in the provision of an improved wheel structure as described which comprises both a wheel and a locator plate cooperative therewith to enforce thereon a condition of coaxiality relative to the drum and axle assembly upon which it is mounted; the locator plate being cooperative with such assembly to effect a predetermined positional relationship therewith resulting in such condition of coaxiality of the wheel with the axis of rotation of the drum and axle assembly. Still another object is that of providing an improved wheel structure of the type described which accommodates drum and axle assemblies having a variety of circular diameters defined by the lug bolts thereof while accurately locating the wheel in a condition of coaxiality relative to the axis of rotation defined by such assembly, and which wheel structure tends to transmit torque from such drum to the tire-equipped wheel through the lug bolts projecting from the drum and through the wheel structure, but does not transmit such torque nor the weight of the vehicle through said locator plate.

A further object is to provide an improved wheel structure that includes both a wheel and locator plate, and in which the locator plate cooperates with the axially projecting hub of a drum and axle assembly to enforce a predetermined positional relationship upon the locator plate in which the alignment center thereof (which may be its geometric center) is substantially coincident with the axis of rotation established by the drum and axle assembly. Additional objects and advantages of the invention, particularly as concerns specific features and details thereof, will become apparent as the specification proceeds.

Embodiments of the invention are illustrated in the accompanying drawing, in which:

FIG. 1 is an exploded perspective view illustrating a wheel structure embodying the present invention and a drum and axle assembly upon which it can be mounted;

FIG. 2 is a front-face view in elevation of the locator plate which forms a part of the wheel structure, and superimposed thereon in broken lines are the lug bolt openings provided by the wheel of such structure;

FIG. 3 is a transverse sectional view taken along the line 3—3 of FIG. 1;

FIG. 4 is an enlarged, broken transverse sectional view similar to that of FIG. 3;

FIG. 5 is a broken vertical sectional view of a portion of the structure illustrated in FIGS. 3 and 4, the section being taken along the line 5—5 of FIG. 4; and FIG. 6 is a broken fragmentary sectional view illustrating a portion of a modified locator plate.

A wheel structure 10 and illustrative drum and axle assembly 11 upon which it can be mounted are illustrated in FIG. 1 in spaced apart relation. The wheel structure 10 comprises a wheel 12 and locator plate 13, and the drum and axle assembly comprises a brake drum 14 and axle 15. The assembly 11 may be provided by a conventional automobile or similar vehicle, and in the form shown is intended to be illustrative of either a front or back drum and axle assembly thereof, since as respects the present invention there is no critical difference therebetween. The drum 14 is equipped with a plurality of angularly spaced lug bolts 16 that describe a circle of fixed diameter coaxial with the axis of rotation defined by the assembly 11, and which axis of rotation thereof is essentially coincident with the longitudinal axis of the axle 15. The assembly 11 is further provided with an outwardly extending central hub 17 which is coaxially circumjacent the axis of rotation of the assembly 11.

The wheel 12 has an outer rim 18 adapted to have a tire (not shown) mounted thereon, and extending inwardly from the rim 18 is a center web 19 rigid therewith. The web 19 may take various forms and in the embodiment illustrated, constitutes a plurality of angularly spaced spokes 20 secured at their outer ends to the rim 18 and a center disc 21 to which the spokes are rigidly related at their inner ends. An arcuate cap or hub cover 22 projects outwardly from the disk 21 and is adapted to enclose the hub 17 of the drum and axle assembly, as shown best in FIG. 3. The wheel 12 in the usual case is known as a custom or cast wheel in which the web 19 thereof is integrally cast with the rim 18 from a relatively lightweight material such as aluminum or magnesium or alloys thereof. In some instances the rim 18 is formed of steel and welded or otherwise rigidly secured to a cast web 19.

The wheel 12, and more particularly the web 19 and disc 21 thereof, is provided with a plurality of angularly spaced lug bolt openings or slots 23 respectively adapted to pass the lug bolts 16 therethrough, wherefore the openings 23 have the same angular spacing therebetween as the lug bolts 16 and are spaced radially outwardly from the axis of rotation of the wheel (which is coincident with the axis of rotation of the assembly 11) by a distance generally corresponding to the radial placement of the lug bolts 16. More particularly in this respect, the openings 23 are elongated radially so as to pass lug bolts therethrough from a variety of drum and axle assemblies in which the circles described by the lug bolts 16 thereof have different diameters. As indicated hereinbefore, the most common drum and axle assemblies provide five angularly spaced lug bolts describing circles having diameters of either 4½ inches, 4¾, inches, or 5 inches; and the openings 23 in the wheel 12 are elongated radially to an extent sufficient to accommodate drum and axle assemblies having lug bolts describing circles with any of the three diameters noted.

The radial elongation of each opening 23 is best illustrated in FIG. 4 which shows that the opening in its radial dimension does not necessarily touch the tapered inner end 24 of a fastener in the form of a lug nut 25 having internal threads adapted to engage and be tightened onto any one of the lug bolts 16 which are threaded for this purpose. However, in the opposite or angular direction, each opening 23 is much narrower and more closely confines the tapered end 24 of the lug nut 25, as shown in FIG. 5. The walls defining each opening 23 may be tapered so as to conform to the taper of the inner end 24 of the lug nuts 25, and the tapered wall of an opening 23 may abut such end 24 along one or both sides thereof, as seen in FIG. 5. In the case of the wheel 12 being a cast component, the taper of the walls defining each opening 23 may be essentially a draft taper. Obviously the walls defining each opening 23 and the end 24 of the lug nuts may be straight rather than tapered. A washer 26 is interposed between the head of each lug nut 25 and underlying surface of the wheel web 19 so as to span the associated opening 23, as shown in FIGS. 3, 4, and 5 and to prevent damage to the finish of the web 19 which otherwise might be caused by tightening the nuts 25 thereagainst in securing the structure to the drum and axle assembly. Such washer in the preferred embodiment is of such size as to completely conceal elongated opening 23 for reasons of esthetics.

The locator plate 13 has an alignment center adapted to be aligned with the axis of rotation of the drum and axle assembly 11; and in the case of the locator plate being a cylindrical annulus as shown in FIG. 2, the alignment center thereof is the geometric center of the plate. Such center lies within and is the origin of a large central opening 27 defined by the surrounding ring-shaped annulus 28, and such annulus is turned outwardly along the opening 27 to define an axially extending lip 29 dimensioned to snugly seat upon the outer cylindrical surface of the hub 17, as shown in FIGS. 3 and 4. The opening 27 in the plate 13 is carefully positioned so as to be coaxial with the alignment center of the plate and is dimensionally accurate along its inner surface or edge which seats upon the hub 17 so as to form in association therewith alignment means interconnecting the drum and axle assembly and the locator plate so as to enforce a predetermined positional relationship in which the alignment center of the plate is substantially coincident with the axis of rotation of the assembly 11.

The locator plate 13 has a plurality of sets (there being five in the embodiment shown, respectively denoted with the numerals 30a, 30b, 30c, 30d, and 30e) of lug-opening means, each comprising a plurality of lug openings angularly separated from each other and disposed at different distances from the alignment center of the plate 13 so as to accommodate lug bolts 16 provided by a variety of drum and axle assemblies and still enable the locator plate to have its alignment center substantially coincident with the axis of rotation of any such assembly. Thus, each set 30 of lug opening means in the particular form shown comprises three individual openings respectively denoted with the numerals 31, 32, and 33 (the suffixes a through e being used where appropriate to relate such openings to the particular set 30 defined thereby).

All of the openings 31 define a circle having its origin at the alignment center of the locator plate 13 and, analogously, the openings 32 and 33 respectively define circles of progressively larger diameters. Referring to the specific dimensional example used hereinbefore, the circle defined by the openings 31 may have a diameter of 4½ inches, the circle defined by the openings 32 may have a diameter of 4¾ inches, and the circle defined by the openings 33 a diameter of 5 inches. Thus, the openings 31, 32, and 33 are respectively adapted to seat therein lug bolts 16 provided by different drum and axle assemblies respectively providing lug bolts defining circles of 4½-, 4¾-, and 5-inch diameters.

The openings 31, 32, and 33 are approximately the same diameter as the lug bolts 16 so as to seat the same therein and thereby provide a determinate positional orientation on the locator plate 13 relative to the axis of rotation of the drum and axle assembly 11. Accordingly, the openings 31, 32 and 33 in association with the lug bolts 16 define alignment means interconnecting the locator plate 13 and drum and axle assembly so as to position the alignment center of the locator plate in coincident relationship with the axis of rotation of the drum and axle assembly. It might be observed that the openings 31, 32, and 33 can be of different sizes if required by the lug bolts 16 to be respectively accommodated thereby, and in a specific instance, the openings 31 and 33 have 17/32-inch diameters and the openings 32 a 15/32-inch diameter. Thus, plate 13 is centered relative to the hub axis by having the apertures therein aligned with the lug bolts and/or by having the center opening 27 in matching relationship to the hub diameter. If the plate is centered with this latter arrangement, it would be possible to utilize a narrow annular band entirely within the bolt circle and eliminate the apertures.

Centering structure is included for coaxially locating the wheel 12 with the axis of rotation of the drum and axle assembly 11, and such centering structure includes interengaging abutment surfaces 34 and 35 respectively provided by opposing surfaces of the wheel 12 and locator plate 13. In a more particular reference, the abutment surfaces 34 and 35 are continuous and constitute the outer surface of the axially extending lip 29 of the locator plate and the circumjacent surface of the wheel which seats thereon. Such centering structure might be otherwise located and in certain instances, for example, could be disposed along the outer cylindrical edge 36 of the plate 13 which (as shown in FIG. 4) is spaced slightly from the circumjacent surface of the wheel so as to cause no interference with the alignment enforced upon the wheel by the cooperative engagement of the abutment surfaces 34 and 35.

In use of the wheel structure, the locator plate 13 is mounted upon a drum and axle assembly 11 by angularly displacing the plate as necessary to align the appropriate openings 31, 32, or 33, as the case may be, with the lug bolts 16 provided by such assembly. The locator plate is then pushed inwardly to lug the lub bolts through the openings aligned therewith, and the plate is automatically oriented so that the alignment center thereof is substantially coincident with the axis of rotation defined by the assembly. Next, the wheel 12 is oriented so that the radially elongated slots or openings 23 thereof are aligned with the lug bolts 16, and the wheel is displaced inwardly to pass the lug bolts through such openings. As explained hereinbefore, the openings 23 are sufficiently elongated in a radial sense to accommodate the lug bolts 16 irrespective of the diameter of the particular circle defined thereby.

As part of the positioning of the wheel 12, the abutment surface 34 thereof is seated upon the mating abutment surface 35 of the locator plate 13, whereupon the wheel is automatically centered so that it, and especially the rim 18 thereof, is coaxially disposed with respect to the axis of rotation defined by the drum and axle assembly 11. The washers 26 are then placed upon the lug bolts 16 and the nuts 25 tightened in the ordinary manner to clamp the wheel structure 16 to the drum and axle assembly 11. As will be understood, the locator plate 13 is oriented with the alignment center thereof substantially coincident with the axis of rotation of the assembly, and the wheel 12 is aligned by the locator plate 13 so as to be coaxially concentric to such axis of rotation, all prior to installation of the lug nuts.

It will be observed that in the particular embodiment of the invention illustrated, the alignment means interconnecting the locator plate 13 and the drum and axle assembly 11 includes, first, and cooperative relationship of the openings 31, 32, and 33 with the associated lug bolts 16 and, second, the cooperative relationship of the edge 27 of the lip 29 with the hub 17 of such assembly. It will be appreciated that one or the other of these relationships could be adequate to enforce upon the plate 13 an orientation in which the alignment center thereof is coincident with the axis of rotation of the drum and axle assembly 11.

In those instances in which proper alignment is enforced upon the locator plate 13 because of its cooperative relationship with a hub 17, it is necessary that the plate provide a surface 27 of substantially the same diameter as that of the hub upon which it is to be seated. In certain vehicles the outer diameters of the hubs may vary, in which case the diameter of the opening 27 in the locator plate must correspondingly change. An example of such a variation is illustrated in FIG. 6, in which the hub 17' has a somewhat smaller diameter than that of the hub 17, and the lip 29' of the locator plate 13' is enlarged in thickness so that the inner edge 27' thereof seats snugly upon the hub 17'. In FIG. 6 the primed form of the numerals heretofore used is employed to designate respectively corresponding components.

Evidently, the abutment surfaces 34 and 35 are machined or otherwise finished to relatively close tolerances so as to enforce the desired positional relationship upon the wheel 12 and locator plate 13 and, similarly, the edge 27 of the locator plate is also finished in those instances in which it is used to properly locate the plate relative to a drum and axle assembly. It may be observed that the abutment surface 34 and the rim 18 of the wheel 12 are turned from the same center hole location so that there is no possibility of inaccuracy in the coaxiality of the rim 18 relative to the axis of rotation defined by the drum and axle assembly 11 as long as the locator plate 13 is accurately located thereon. The locator plate 13, which may be a steel stamping, does not detract in any sense from the appearance of the wheel 12 since it is hidden from view behind the web 19 thereof, as is most evident in FIGS. 3 and 4.

Although centering of the wheel is effected through the locator plate 13, positive and negative torques (i.e., acceleration and braking torques or rotary stresses) are transmitted from the drum 14 to the wheel 12 essentially through the lug bolts 16 and lug nuts or shanks 25.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

I claim:

1. A wheel structure, including: a first vehicle drum mounted for rotation about a horizontal axis and provided with a plurality of lug bolt securing means, each including a threaded shaft of one diameter integral with said drum and a separate nut threaded on said shaft, said lug bolt means being disposed radially outwardly from the axis of rotation; a wheel having an outer rim for receipt of a tire thereon and an inner web structure rigid with the rim and provided with a plurality of angularly spaced lug bolt openings respectively receiving said lug bolt means therethrough without substantial angular play and being radially elongated for receiving lug bolt means of at least one other drum and axle assembly in which the lug bolt means thereof are at a different radial distance from such axis of rotation than said first assembly; a locator plate positioned between said drum and said wheel having a set of lug openings respectively receiving with a close fit and being of substantially the same diameter as said lug shafts and further having a different set of lug openings thereabout for respectively receiving without play the shafts of the lug bolts provided by a different vehicle drum; an axially extending alignment surface on said locator plate spaced from said lug openings, and said locator plate being fixedly held in a predetermined position relative to said drum axis of rotation by said lug bolt shafts and the corresponding lug opening set of said locator plate; and an axially extending centering surface means on said wheel web facing said drum and engaging said locator plate alignment surface to enforce upon said wheel a predetermined positional relationship of coaxiality thereof with said plate and with such axis of rotation os said drum, whereby said lug bolt securing means clamp said wheel in said position of coaxiality and include means preventing circumferential movement of said wheel with respect to said drum.

2. The wheel structure of claim 1 in which said alignment and centering surfaces include circumjacent cooperative annular abutment surfaces respectively provided by said wheel and locator plate in coaxial disposition with the axis of rotation, the abutment surface provided by said locator plate being adapted to seat thereon the abutment surface provided by said wheel.

3. The wheel structure of claim 2 in which said drum is further provided with an outwardly extending central hub coaxially circumjacent the axis of rotation, and in which said locator plate is provided centrally with a relatively large hub-receiving opening having a cylindrical edge coaxially aligned with the axis of rotation, said cylindrical edge constituting further alignment means engaging said central hub for interconnecting said locator plate with such drum.

4. The wheel structure of claim 1 in which said drum is further provided with an outwardly extending central hub coaxially circumjacent the axis of rotation, and in which said locator plate is provided centrally with a relatively large hub-receiving opening having a cylindrical edge coaxially aligned with the axis of rotation, said cylindrical edge constituting further alignment means engaging said central hub for interconnecting said locator plate with such drum.

5. The wheel structure of claim 1, wherein said nuts angularly tightly engage only the lug bolt openings in said wheel to constitute the sole means for transferring torque and vertical forces between said wheel and said shafts of said bolt means.

6. The wheel structure of claim 1, wherein said lug bolt openings of said wheel and said lug bolt means constitute the sole means for transferring torque and weight directly from said wheel to said drum.

7. A wheel structure, including: a first vehicle drum mounted for rotation about a horizontal axis and provided with a plurality of lug bolt securing means, each including a threaded shaft of one diameter integral with said drum and a separate nut threaded on said shaft, said lug bolt means being disposed radially outwardly from the axis of rotation; a wheel having an outer rim for receipt of a tire thereof and an inner web structure rigid with the rim and provided with a plurality of angularly spaced lug bolt openings respectively receiving said lug bolt means therethrough without substantial angular play and being radially elongated for receiving lug bolt means of at least one other drum and axle assembly in which the lug bolt means thereof are at a different radial distance from such axis of rotation than said first assembly; a locator plate positioned between said drum and said wheel, first cooperating means on said plate and said drum centering said plate on said drum relative to said drum axis of rotation, and second cooperating means on said plate and said wheel centering said wheel on said plate when said lug bolt means extend through said angularly spaced elongated lug bolt openings and prior to the installation of said nuts.

8. A wheel structure as set forth in claim 7 in which said first cooperating means includes a central opening in said plate engageable with an axial portion of said drum.

9. A wheel structure as set forth in claim 7 in which said first cooperating means includes a set of lug openings respectively receiving with a close fit and being of substantially the same diameter as said lug shafts.

10. A wheel structure as set forth in claim 7 in which said plate and said wheel have confronting surfaces, said second cooperating means including means extending from one of said surfaces and complementary receiving means on the other of said surfaces.

11. A wheel structure a set forth in claim 7 in which said plate has a set of lug openings receiving with a close fit and being of substantially the same diameter as said lug shafts and further having a different set of lug openings thereabout for respectively receiving without play the shafts of the lug bolts provided by a different vehicle drum.